(12) United States Patent
Jeong (10) Patent No.: US 11,760,252 B2
(45) Date of Patent: Sep. 19, 2023

(54) VEHICLE AND METHOD OF CONTROLLING THE SAME

(71) Applicants: HYUNDAI MOTOR COMPANY, Seoul (KR); KIA CORPORATION, Seoul (KR)

(72) Inventor: Yongseok Jeong, Yongin-si (KR)

(73) Assignees: Hyundai Motor Company, Seoul (KR); Kia Coprporation, Seoul (KR)

( * ) Notice: Subject to any disclaimer, the term of this patent is extended or adjusted under 35 U.S.C. 154(b) by 263 days.

(21) Appl. No.: 17/327,948

(22) Filed: May 24, 2021

(65) Prior Publication Data

US 2022/0072991 A1  Mar. 10, 2022

(30) Foreign Application Priority Data

Sep. 4, 2020  (KR) .......................... 10-2020-0113245

(51) Int. Cl.

| | |
|---|---|
| *B60Q 1/34* | (2006.01) |
| *B60K 35/00* | (2006.01) |
| *B60Q 1/00* | (2006.01) |
| *B60Q 1/26* | (2006.01) |
| *H04W 4/80* | (2018.01) |
| *F21S 10/06* | (2006.01) |
| *H04B 17/318* | (2015.01) |

(52) U.S. Cl.

CPC ......... *B60Q 1/0023* (2013.01); *B60Q 1/2669* (2013.01); *F21S 10/06* (2013.01); *H04B 17/318* (2015.01); *H04W 4/80* (2018.02); *B60Q 2900/30* (2013.01)

(58) Field of Classification Search

CPC ................ B60Q 1/0023; B60Q 1/2669; B60Q 2900/30; F21S 10/06; H04B 17/318; H04B 17/23; H04B 17/27; H04W 4/80; H04W 4/025; H04W 4/40; B60R 25/245; B60R 2325/205; B60R 25/24; B60R 25/10; B60R 25/34; B60R 2025/1013; B60R 2325/101; B60R 2325/103; G07C 9/00309; G07C 9/00571

USPC ......................................................... 340/468

See application file for complete search history.

(56) References Cited

U.S. PATENT DOCUMENTS

| | | | |
|---|---|---|---|
| 2019/0122464 A1* | 4/2019 | DeLong | B60R 25/20 |
| 2021/0096629 A1* | 4/2021 | Thivierge, Jr. | H04W 4/80 |

(Continued)

*Primary Examiner* — Tanmay K Shah (74) *Attorney, Agent, or Firm* — Morgan, Lewis & Bockius LLP (57) ABSTRACT

A vehicle configured for guiding an optimal digital key tag position to a digital key user and a method of controlling the vehicle may include a short-range communication module configured to receive a signal from a digital key within a preset distance ranging from the short-range communication module to the digital key; a lamp; and a controller connected to and configured to control the lamp and the short-range communication module based on a received signal strength indicator (RSSI) of the received signal. The controller may be configured to determine a reference range based on the RSSI of the received signal in a first mode, to control the lamp to provide information related to a position of the digital key according to the RSSI of the received signal and the reference range in a second mode, and to control the short-range communication module to transmit a signal regarding the position of the digital key to the digital key in the second mode.

18 Claims, 8 Drawing Sheets

(56) References Cited

U.S. PATENT DOCUMENTS

2021/0214991 A1\* 7/2021 Cruz ........................ B60R 25/01
2021/0291832 A1\* 9/2021 Simmons .............. B60W 10/20

\* cited by examiner

VEHICLE AND METHOD OF CONTROLLING THE SAME

CROSS-REFERENCE TO RELATED APPLICATION(S)

The present application claims priority to Korean Patent Application No. 10-2020-0113245, filed on Sep. 4, 2020, the entire contents of which is incorporated herein for all purposes by this reference.

BACKGROUND OF THE INVENTION

Field of the Invention

The present invention relates to a vehicle and a method of controlling the vehicle, and more particularly, to a vehicle that allows a user to efficiently use a digital key, and a method of controlling the vehicle.

Description of Related Art

With the development of vehicle IT technology, today's vehicles provide various functions for user convenience in addition to functions as basic means of transportation.

As one of these various functions, a smart key system has been developed that supports functions such as automatic door opening and closing of the vehicle and starting. The smart key system authenticated the smart key by transmitting an LF (Low Frequency) signal to a smart key from a smart key controller (SMK ECU) to determine whether the smart key has proper authority for the vehicle and receiving a radio frequency (RF) response signal for the corresponding LF signal from the smart key.

However, in recent years, a research on a vehicle access start system that opens the door of the vehicle through a Near Field Communication (NFC) communication instead of such a communication method has been conducted.

The information included in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a vehicle configured for guiding an optimal digital key tag position to a digital key user and a method of controlling the vehicle.

Additional aspects of the present invention will be set forth in part in the description which follows, and in part, will be obvious from the description, or may be learned by practice of the present invention.

According to various aspects of the present invention, there is provided a vehicle including: a short-range communication module configured to receive a signal from a digital key within a preset distance ranging from the short-range communication module to the digital key; a lamp; and a controller connected to and configured to control the lamp and the short-range communication module based on a received signal strength indicator (RSSI) of the received signal.

The controller may be configured to determine a reference range based on the RSSI of the received signal in a first mode, to control the lamp to provide information related to a position of the digital key according to the RSSI of the received signal and the reference range in a second mode, and to control the short-range communication module to transmit a signal regarding the position of the digital key to the digital key in the second mode.

In a response to a change in the RSSI of the received signal, the controller may be configured to control the lamp to provide information related to access of the digital key based on the RSSI of the received signal.

The controller may be configured to determine a maximum value of the RSSI of the received signal in the first mode, and to determine the reference range based on the maximum value.

In a response to the RSSI of the received signal being within the reference range in the second mode, the controller may be configured to control the lamp to inform that a current position of the digital key is an optimal position.

The controller may be configured to control the lamp to start blinking in a response to the digital key approaching within the preset distance.

In a response to the RSSI of the received signal being within the reference range in the second mode, the controller may be configured to control an audio video navigation (AVN) device of the vehicle to indicate that a current position of the digital key is an optimal position.

The short-range communication module may include a Near Field Communication (NFC) communication module or a Bluetooth communication module, and is provided on a door handle of the vehicle.

According to various aspects of the present invention, there is provided a vehicle including: a short-range communication module configured to receive a signal from a digital key within a preset distance ranging from the short-range communication module to the digital key; and a controller configured to control the short-range communication module based on a received signal strength indicator (RSSI) of the received signal.

The controller may be configured to determine a reference range based on the RSSI of the received signal in a first mode, and to control the short-range communication module to transmit a signal regarding the position of the digital key to the digital key in the second mode based on the RSSI of the received signal and the reference range in a second mode.

In a response to a change in the RSSI of the received signal, the controller may be configured to control the short-range communication module to provide information related to access of the digital key based on the RSSI of the received signal.

The controller may be configured to determine a maximum value of the RSSI of the received signal in the first mode, and to determine the reference range based on the maximum value.

In a response to the RSSI of the received signal being within the reference range in the second mode, the controller may be configured to control the short-range communication module to transmit a signal indicating that the current position of the digital key is an optimal position to the digital key.

In a response to the RSSI of the received signal being within the reference range in the second mode, the controller may be configured to control the AVN device to indicate that the position of the digital key is the optimal position.

The short-range communication module may include a Near Field Communication (NFC) communication module, and is provided on a door handle of the vehicle.

The digital key communicating with the short-range communication module may be a mobile device.

According to various aspects of the present invention, there is provided a method of controlling a vehicle including: receiving, by a short-range communication module, a signal from a digital key within a preset distance ranging from the short-range communication module to the digital key; controlling, by a controller, a lamp and the short-range communication module according to a received signal strength indicator (RSSI) of the received signal; determining, by the controller, a reference range according to the RSSI of the received signal in a first mode; controlling, by the controller, the lamp to provide information related to a position of the digital key according to the RSSI of the received signal and the reference range in a second mode; and controlling, by the controller, the short-range communication module to transmit a signal regarding the position of the digital key to the digital key in the second mode.

The controlling of the lamp based on the RSSI may include, in a response to a change in the RSSI of the received signal, controlling, by the controller, the lamp to provide information related to access of the digital key according to the RSSI of the received signal.

The determining of the reference range may include determining, by the controller, a maximum value of the RSSI of the received signal in the first mode; and determining, by the controller, the reference range based on the maximum value.

The controlling of the lamp to provide information related to the position of the digital key may include, in a response to the RSSI of the received signal being within the reference range in the second mode, controlling, by the controller, the lamp to inform that a current position of the digital key is an optimal position.

The method may further include controlling, by the controller, the lamp to start blinking in a response to the digital key approaching within the preset distance.

The method may further include, in a response to the RSSI of the received signal being within the reference range in the second mode, controlling, by the controller, an audio video navigation (AVN) device of the vehicle to indicate that a current position of the digital key is an optimal position.

The short-range communication module may include a Near Field Communication (NFC) communication module or a Bluetooth communication module, and is provided on a door handle of the vehicle.

The digital key may be a mobile device or an NFC card key.

According to various aspects of the present invention, there is provided a method of controlling a vehicle including: receiving, by a short-range communication module, a signal from a digital key within a preset distance ranging from the short-range communication module to the digital key; controlling, by a controller, a lamp and the short-range communication module according to a received signal strength indicator (RSSI) of the received signal; determining, by the controller, a reference range according to the RSSI of the received signal in a first mode; and controlling, by the controller, the short-range communication module to transmit a signal regarding a position of the digital key to the digital key based on the RSSI of the received signal and the reference range in a second mode.

The controlling of the short-range communication module based on the RSSI may include, in a response to a change in the RSSI of the received signal, controlling the short-range communication module to transmit a signal regarding the access of the digital key to the digital key based on the RSSI of the received signal.

The determining of the reference range may include determining, by the controller, a maximum value of the RSSI of the received signal in the first mode; and determining, by the controller, the reference range based on the maximum value.

The controlling of the short-range communication module to transmit the signal regarding the position of the digital key to the digital key may include, in a response to the RSSI of the received signal being within the reference range in the second mode, controlling the short-range communication module to transmit the signal indicating that the current position of the digital key is the optimal position to the digital key.

The method may further include, in a response to the RSSI of the received signal being within the reference range in the second mode, controlling, by the controller, an audio video navigation (AVN) device of the vehicle to indicate that a current position of the digital key is an optimal position.

The digital key may be a mobile device.

The methods and apparatuses of the present invention have other features and advantages which will be apparent from or are set forth in more detail in the accompanying drawings, which are incorporated herein, and the following Detailed Description, which together serve to explain certain principles of the present invention.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Like reference numerals refer to like elements throughout the specification. Not all elements of the exemplary embodiments of the present invention will be described, and the description of what are commonly known in the art or what overlap each other in the exemplary embodiments will be omitted. The terms as used throughout the specification, such as "~part," "~module," "~member," "~block," etc., may be implemented in software and/or hardware, and a plurality of "~parts," "~modules," "~members," or "~blocks" may be implemented in a single element, or a single "~part," "~module," "~member," or "~block" may include a plurality of elements.

It will be further understood that the term "connect" and its derivatives refer both to direct and indirect connection, and the indirect connection includes a connection over a wireless communication network.

The terms "include (or including)" and "comprise (or comprising)" are inclusive or open-ended and do not exclude additional, unrecited elements or method steps, unless otherwise mentioned.

Furthermore, when it is stated that a layer is "on" another layer or substrate, the layer may be directly on another layer or substrate or a third layer may be disposed therebetween.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section.

It is to be understood that the singular forms "a," "an," and "the" include plural references unless the context clearly dictates otherwise.

Reference numerals used for method steps are merely used for convenience of explanation, but not to limit an order of the steps. Thus, unless the context clearly dictates otherwise, the written order may be practiced otherwise.

Hereinafter, an operation principle and embodiments of the present invention will be described with reference to accompanying drawings.

Figure 1:
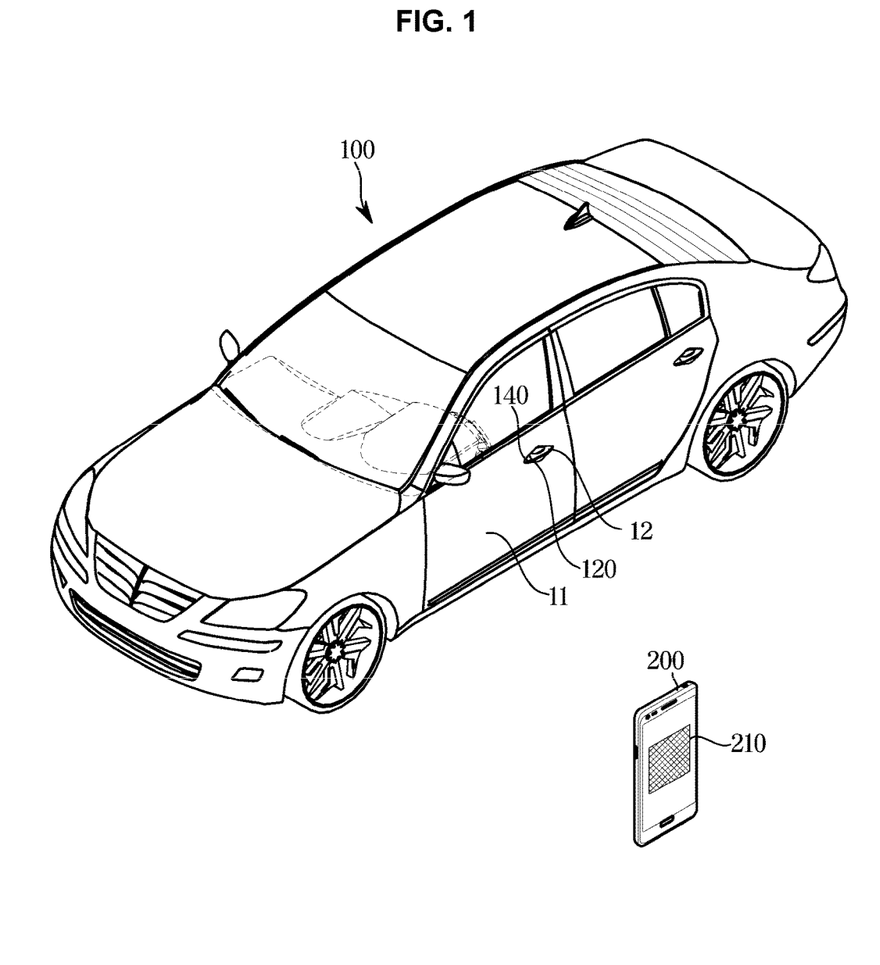
FIG. 1 is a view exemplarily illustrating an exterior of a vehicle and a digital key according to various exemplary embodiments of the present invention.
Figure 2:
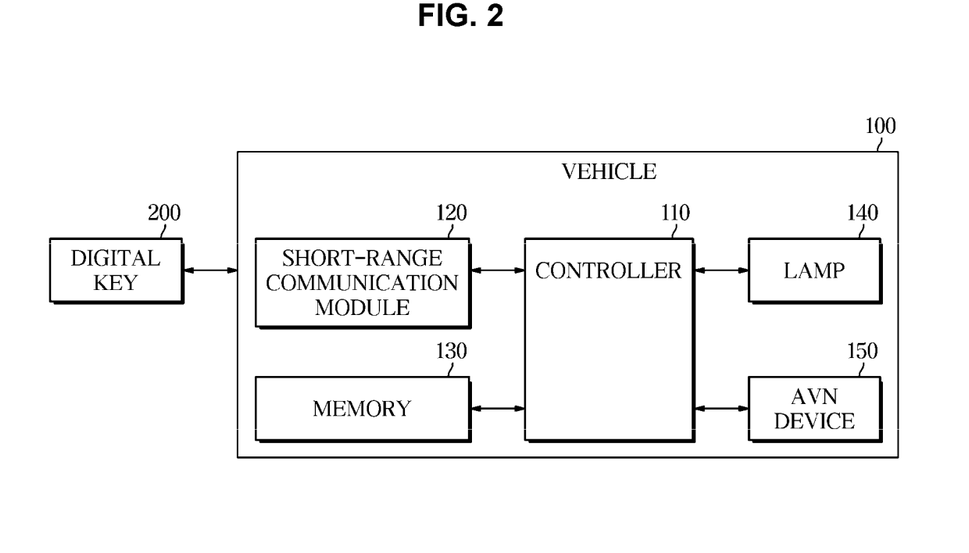
FIG. 2 is a control block diagram of a vehicle according to various exemplary embodiments of the present invention.

FIG. 1 is a view exemplarily illustrating an exterior of a vehicle and a digital key according to various exemplary embodiments of the present invention, and FIG. 2 is a control block diagram of a vehicle according to various exemplary embodiments of the present invention.

Referring to FIG. 1 and FIG. 2, a vehicle 100 may include a door 11, a door handle 12, a controller 110, a short-range communication module 120, a memory 130, a lamp 140, and an audio video navigation (AVN) device 150.

The door 11 is provided to be pivotal on the left and right sides of the vehicle 100 so that the user can board the interior of the vehicle 100 when opened, and shields the interior of the vehicle 100 from the outside thereof when closed.

The door handle 12 is provided on the door 11, and a user may open the door 11 by manipulating the door handle 12.

The short-range communication module 120 may include a Near Field Communication (NFC) communication module or a Bluetooth communication module.

The short-range communication module 120 may be provided on the door handle 12 of the vehicle 100, but is not limited thereto. When the digital key 200 held by the user approaches the vehicle 100, the short-range communication module 120 may be provided at any position of the vehicle 100 as long as a short-range communication between the digital key 200 and the vehicle 100 is possible.

The short-range communication module 120 may receive a signal from a digital key through short-range communication and transmit a signal to the digital key.

The short-range communication may be an NFC communication. The NFC communication, as one of the wireless tag (RFID) technologies, is a communication technology that transmits and receives wireless data within a short distance of 10 cm, and because of a short communication distance, it is a short-range communication technology with relatively excellent security and low price.

The short-range communication may be a Bluetooth communication. The Bluetooth communication is a communication technology that enables low-power wireless communication between information devices that are distant from several meters to tens of meters.

The short-range communication module 120 may output a received signal strength indicator (RSSI) of the signal received from the digital key to the controller 110.

The RSSI is a measure of the power received by a wireless receiver.

When the digital key is located close to the short-range communication module 120, the RSSI may be large. When the digital key is far from the short-range communication module 120, the RSSI may be small.

The lamp 140 may be provided on the door handle 12 of the vehicle 100, but is not limited thereto, and may be provided at any position of the vehicle 100 as long as the user can recognize it from outside the vehicle 100.

When attempting to access the vehicle 100 using the digital key, the user may not know a precise position of a tag of the digital key due to the short-range communication module 120 of the vehicle 100 which is different for each vehicle 100 and the short-range communication module 120 of the digital key which is different for each digital key.

The controller 110 may control the lamp 140 to indicate that a current position of the digital key is an optimal position.

The controller 110 may control the short-range communication module 120 to transmit a signal indicating that the current position of the digital key is the optimal position to the digital key.

The optimal position may be a tag position at which the short-range communication module 120 can properly recognize the digital key. When the digital key is in the optimal position, the RSSI of the signal received from the digital key by the short-range communication module 120 may be maximum.

The controller 110 may determine a reference range based on the RSSI of the signal received by the short-range communication module 120 in a first mode.

The reference range may be a range of the RSSI determined based on a maximum value of the RSSI of the signal received in the first mode. The reference range may be a range of RSSI within a certain value based on the maximum value of RSSI. When the RSSI of the signal received from the digital key is within the reference range, a position of the digital key may be the optimal position.

The first mode is a mode in which the controller 110 determines the reference range based on the RSSI of the signal received between first and second points.

The first point in time may be a point in time when the digital key enters a preset distance.

The preset distance may be a distance from the short-range communication module 120 in which the digital key can communicate with the short-range communication module 120 to the digital key.

The second point may be a point in time when a preset time has passed from the first point. The preset time may be a time when the short-range communication module 120 receives RSSI required to determine the reference range.

The controller 110 may control the lamp 140 to provide information related to the position of the digital key to the user based on the RSSI and the reference range of the signal received in a second mode, or control the short-range communication module 120.

The second mode is a mode in which the controller 110 provides information related to the position of the digital key to the user based on the RSSI of the received signal after the second point has passed.

The controller 110 may control the short-range communication module 120 to transmit a signal indicating that the current position of the digital key is the optimal position to the digital key when the RSSI of the signal received in the second mode is within the reference range.

The controller 110 may include at least one memory 130 in which programs that perform the above-described operations and operations described later are stored, and at least one processor that executes the stored programs. When the memory 130 and the processor are plural, they may be integrated into one chip, or may be provided in physically separate locations. The memory 130 may include a volatile memory such as a static random access memory (S-RAM) and a dynamic random access memory (D-RAM) for temporarily storing data. Furthermore, the memory 130 may include non-volatile memory such as a ROM (Read Only Memory), an Erasable Programmable Read Only Memory (EPROM), and an EEPROM (Electrically Erasable Programmable Read Only Memory: EEPROM) for storing control programs and control data for a long time. The processor may include various logic circuits and operation circuits, may process data according to a program provided from the memory 130, and may generate a control signal according to the processing result.

The AVN device 150 may be a device configured for performing an audio function, a video function, and a navigation function according to a manipulation of a passenger.

The AVN device 150 may externally output a screen including a predetermined image according to an application being executed.

The digital key 200 may be a mobile device or an NFC card key.

When the digital key 200 approaches within the preset distance from the short-range communication module 120, NFC communication with the short-range communication module 120 may be performed. In the instant case, the preset distance may be a distance configured for NFC communication.

The digital key 200 may include the short-range communication module 210 of the mobile device.

The short-range communication module 210 of the mobile device may transmit the signal to the short-range communication module of the vehicle 100, and may receive the signal from the short-range communication module 120 of the vehicle 100.

Figure 3A:
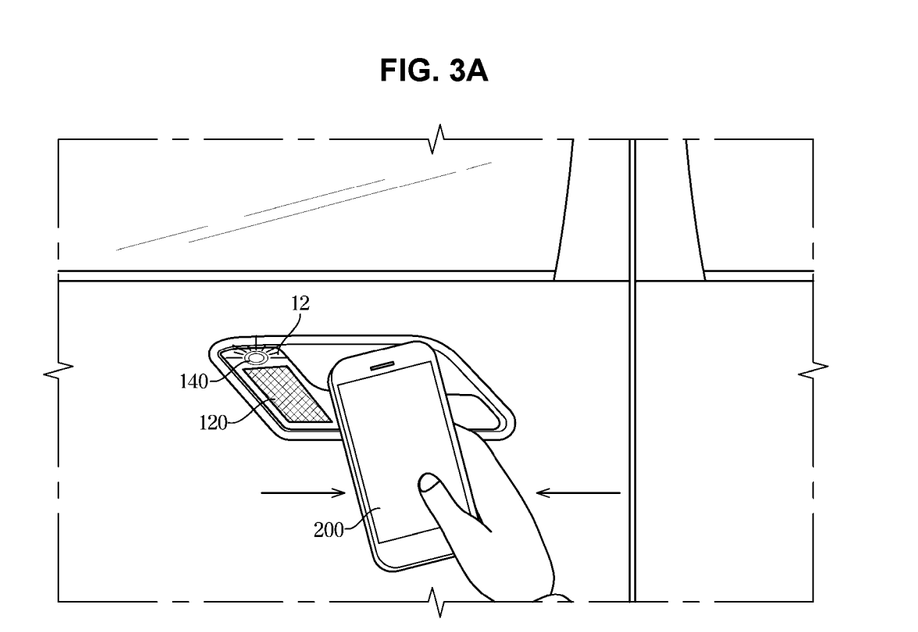
FIG. 3A is a view for describing an example of blinking a lamp so that a user approaches a digital key to an optimal position according to various exemplary embodiments of the present invention.
Figure 3B:
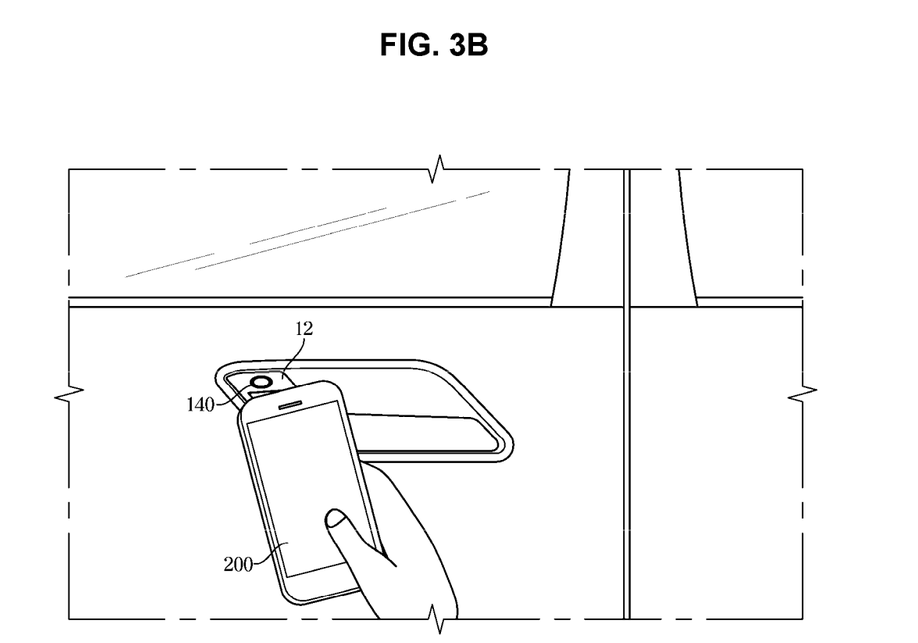
FIG. 3B is a view for describing an example of lighting a lamp when a digital key is in an optimal position according to various exemplary embodiments of the present invention.

FIG. 3A is a view for describing an example of blinking a lamp so that a user approaches a digital key to an optimal position according to various exemplary embodiments of the present invention, and FIG. 3B is a view for describing an example of lighting a lamp when a digital key is in an optimal position according to various exemplary embodiments of the present invention.

Referring to FIG. 3A, the user can approach the digital key to the short-range communication module 120 or move away from the short-range communication module 120 in the first mode or the second mode. At the instant time, the RSSI of the received signal may be changed.

When the RSSI of the received signal is changed, the controller 110 may control the lamp 140 to provide information related to approach to the digital key to the user based on the RSSI of the received signal.

The information related to approach to the digital key may be information for informing the user whether the digital key approaches the short-range communication module 120.

When the user approaches the digital key within the preset distance from the short-range communication module 120, the controller 110 may control the lamp 140 to start flashing.

When the digital key approaches the short-range communication module 120, the RSSI of the received signal increases. At the instant time, the controller 110 may decrease a blinking period of the lamp 140 as the RSSI of the received signal increases.

As the digital key moves away from the short-range communication module 120, the RSSI of the received signal decreases. At the instant time, the controller 110 may decrease the blinking period of the lamp 140 as the RSSI of the received signal increases.

Accordingly, the user may see the change in the blinking period of the lamp 140 and know whether he or she approaches the digital key to the short-range communication module 120.

In the first mode, while the time passes from the first point to the second point, the user may move the digital key near the short-range communication module 120 based on a change in the blinking period of the lamp 140. As described above, since the digital key may be located near the short-range communication module 120 in the first mode, the reference range may be determined based on the maximum value of the RSSI of the signal received in the first mode.

Furthermore, in the second mode, the user may move the digital key near the short-range communication module 120 based on the change in the blinking period of the lamp 140. As described above, since the digital key may be located near the short-range communication module 120 in the second mode, the RSSI of the signal received in the second mode may enter the reference range.

Providing information related to digital key approach to the user based on the RSSI of the received signal as described above may be a method using the blinking period of the lamp 140, but is not limited thereto, and any method may be possible as long as a lighting of the lamp 140 may be used.

Referring to FIG. 3B, the user may place the digital key in the optimal position in the second mode.

When the RSSI of the signal received in the second mode is within the reference range, the controller 110 may control the lamp 140 to inform that the current position of the digital key is the optimal position. At the instant time, the controller 110 may control the blinking lamp 140 to be continuously lit to inform that the current position of the digital key is the optimal position. In the present way, the control of the lamp 140 to inform that the current position of the digital key is the optimal position may be a method of continuously lighting the lamp 140 that has been blinking, but is not limited thereto, and any method may be possible as long as the lighting of the lamp 140 may be used.

Figure 4A:
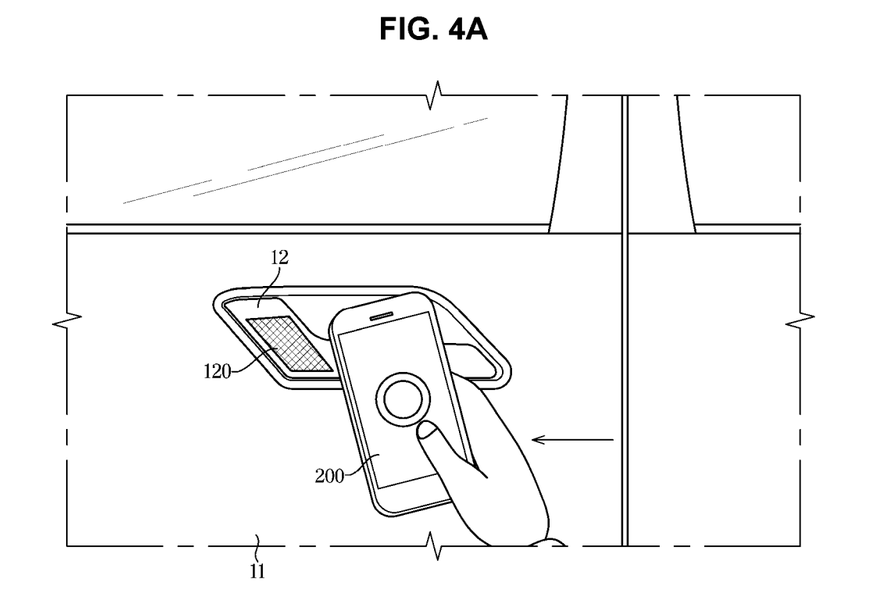
FIG. 4A is a view for describing an example in which a digital key approaches an optimal position according to various exemplary embodiments of the present invention.
Figure 4B:
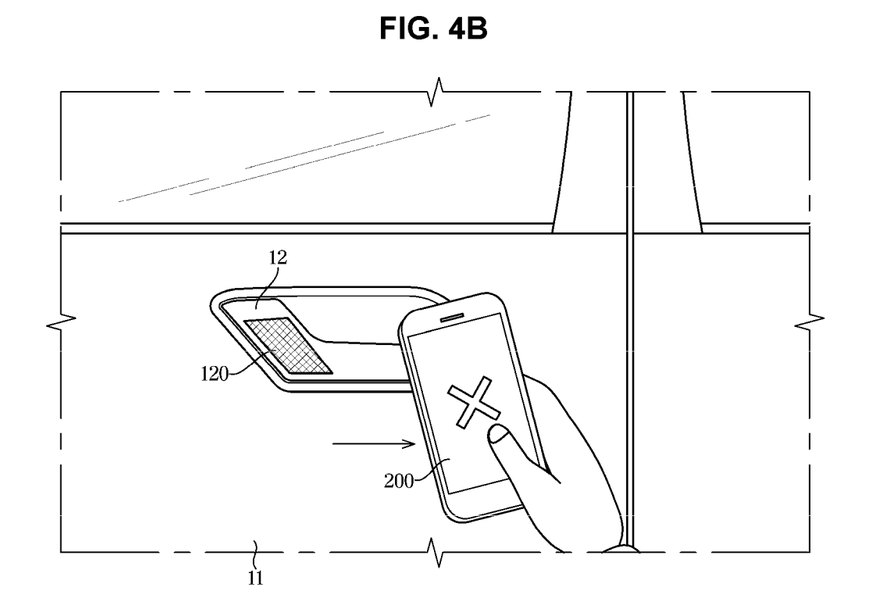
FIG. 4B is a view for describing an example in which a digital key moves away from an optimal position according to various exemplary embodiments of the present invention.
Figure 4C:
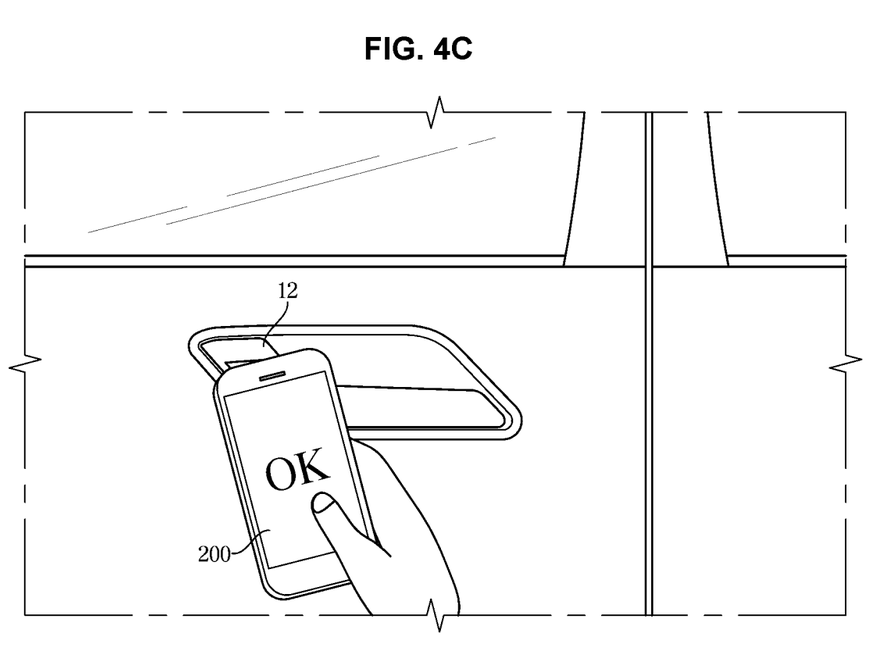
FIG. 4C is a view for describing an example in which a digital key is in an optimal position according to various exemplary embodiments of the present invention.

FIG. 4A is a view for describing an example in which a digital key approaches an optimal position according to various exemplary embodiments of the present invention, FIG. 4B is a view for describing an example in which a digital key moves away from an optimal position according to various exemplary embodiments of the present invention, and FIG. 4C is a view for describing an example in which a digital key is in an optimal position according to various exemplary embodiments of the present invention.

Referring to FIG. 4A and FIG. 4B, the user can approach the digital key to the short-range communication module 120 or move away from the short-range communication module 120 in the first mode or the second mode. At the instant time, the RSSI of the received signal may be changed.

When the RSSI of the received signal changes, the controller 110 may control the short-range communication module 120 to transmit a digital key access signal to the digital key based on the RSSI of the received signal.

The digital key access signal may be a signal transmitted by the short-range communication module 120 to the digital key so that the digital key indicates whether the digital key approaches the short-range communication module 120.

When the digital key approaches the short-range communication module 120, the RSSI of the received signal increases. At the instant time, the controller 110 may control the short-range communication module 120 to transmit a signal indicating that the digital key is approaching the short-range communication module 120 as the RSSI of the received signal increases.

When the digital key receives the signal indicating that the digital key is approaching the short-range communication module 120, the digital key may display information indicating that the digital key is approaching the short-range communication module 120 on a display of the digital key. For example, an indication of information that the digital key is approaching the short-range communication module 120 may be an O-character.

As the digital key moves away from the short-range communication module 120, the RSSI of the received signal decreases. At the instant time, the controller 110 may control the short-range communication module 120 to transmit a signal indicating that the digital key is moving away from the short-range communication module 120 as the RSSI of the received signal increases.

When the digital key receives a signal indicating that the digital key is moving away from the short-range communication module 120, the digital key may display information indicating that the digital key is moving away from the short-range communication module 120 on the display of the digital key. For example, the indication of information that the digital key is moving away from the short-range communication module 120 may be an X-shaped mark.

Accordingly, the user can know whether he or she approaches the digital key to the short-range communication module 120 by looking at the information displayed on the display of the digital key.

In the first mode, while the time passes from the first point to the second point, the user may move the digital key near the short-range communication module 120 based on information displayed on the display of the digital key. As described above, since the digital key may be located near the short-range communication module 120 in the first mode, the reference range may be determined based on the maximum value of the RSSI of the signal received in the first mode.

Furthermore, in the second mode, the user may move the digital key near the short-range communication module 120 based on information displayed on the display of the digital key. As described above, since the digital key may be located near the short-range communication module 120 in the second mode, the RSSI of the signal received in the second mode may enter within the reference range.

Referring to FIG. 4C, the user may place the digital key in the optimal position in the second mode.

When the RSSI of the signal received in the second mode is within the reference range, the controller 110 may control the short-range communication module 120 to transmit the signal indicating that the current position of the digital key is the optimal position to the digital key.

When the digital key receives the signal indicating that the current position of the digital key is the optimal position, the digital key may display information indicating that the current position of the digital key is the optimal position on the display of the digital key. For example, the display of information indicating that the current position of the digital key is the optimal position may be an OK display.

The controller 110 may control the AVN device 150 of the vehicle 100 to indicate that the current position of the digital key is the optimal position when the RSSI of the signal received in the second mode is within the reference range.

Figure 5:
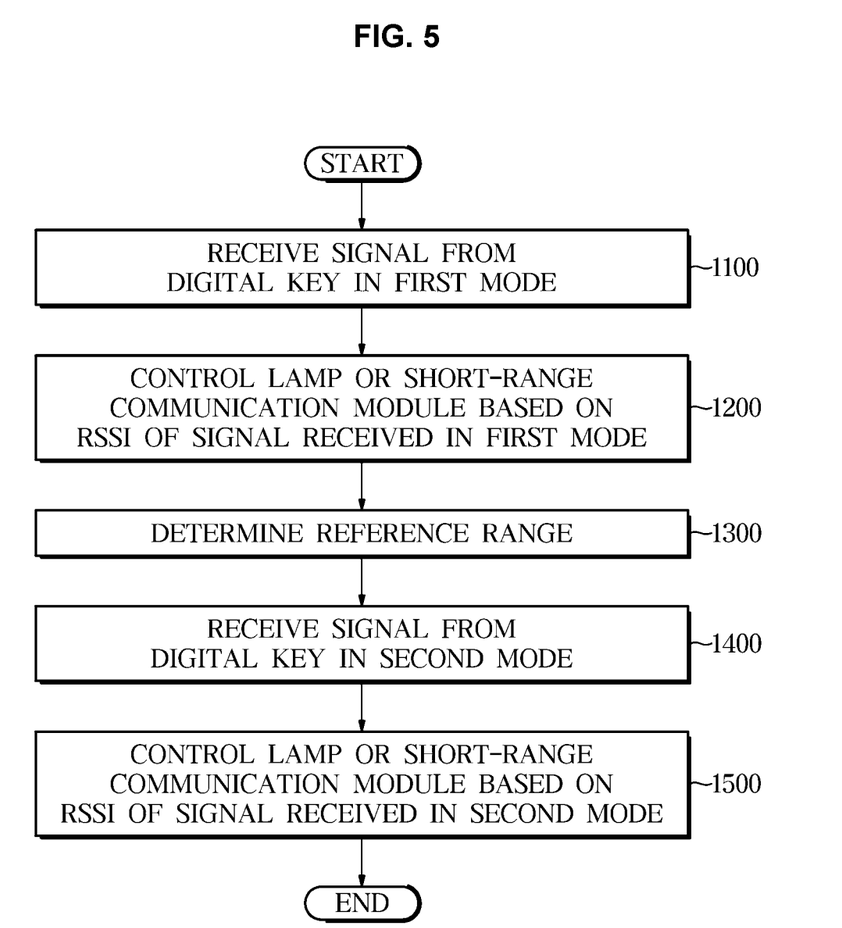
FIG. 5 is a flowchart illustrating a procedure of a vehicle guiding an optimal position according to various exemplary embodiments of the present invention.

FIG. 5 is a flowchart illustrating a procedure of a vehicle guiding an optimal position according to various exemplary embodiments of the present invention. This is only an exemplary embodiment for achieving the object of the present invention, and of course, some configurations may be added or deleted as necessary.

Referring to FIG. 5, the short-range communication module 120 may receive the signal from the digital key (1100). In the instant case, the short-range communication module 120 may receive the signal from the digital key in the first mode, and may output the RSSI of the signal received in the first mode to the controller 110.

The controller 110 may control the lamp 140 or the short-range communication module 120 based on the RSSI of the signal received in the first mode (1200). At the instant time, when the RSSI of the signal received in the first mode changes, the controller 110 may control the lamp 140 to provide information related to digital key access to the user based on the RSSI of the received signal, or control the short-range communication module 120 to transmit the digital key access signal to the digital key.

The controller 110 may determine the reference range based on the RSSI of the signal received by the short-range communication module 120 in the first mode (1300).

The short-range communication module 120 may receive the signal from a digital key (1400). In the instant case, the short-range communication module 120 may receive the signal from the digital key in the second mode, and may output the RSSI of the signal received in the second mode to the controller 110.

The controller 110 may control the lamp 140 or the short-range communication module 120 based on the RSSI of the signal received in the second mode (1500).

At the present time, when the RSSI of the signal received in the first mode changes, the controller 110 may control the lamp 140 to provide information related to digital key access to the user based on the RSSI of the received signal, or control the short-range communication module 120 to transmit the digital key access signal to the digital key.

Furthermore, when the RSSI of the signal received in the second mode is within the reference range, the controller 110 may control the lamp 140 to indicate that the current position of the digital key is the optimal position, or control the short-range communication module 120 to transmit the signal indicating that the current position of the digital key is the optimal position.

Figure 6:
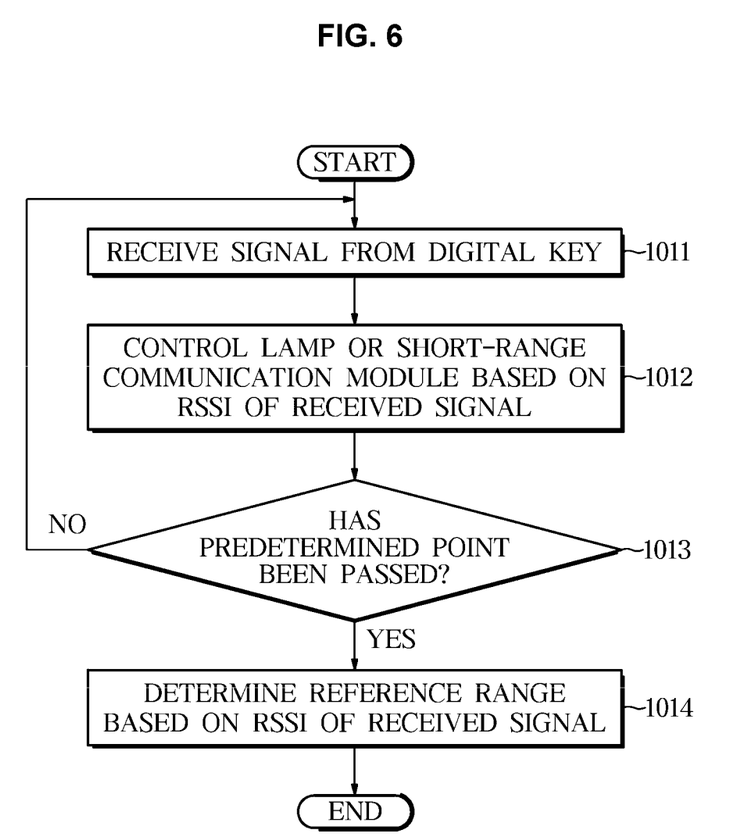
FIG. 6 is a flowchart illustrating a procedure in a first mode according to various exemplary embodiments of the present invention.

FIG. 6 is a flowchart illustrating a procedure in a first mode according to various exemplary embodiments of the present invention.

Referring to FIG. 6, in the first mode, the short-range communication module 120 may receive the signal from the digital key (1011). At the instant time, when the user approaches the digital key within the preset distance from the short-range communication module 120 and the short-range communication module 120 can receive the signal from the digital key, the controller 110 may control the lamp 140 to start the blinking.

The controller 110 may control the lamp 140 or the short-range communication module 120 based on the RSSI of the signal received in the first mode (1012). At the instant time, the user may know whether he or she approaches the digital key to the short-range communication module 120 by looking at the change in the blinking period of the lamp 140 or the information displayed on the display of the digital key.

The controller 110 may determine whether a predetermined point has passed in the first mode (1013). In the instant case, the predetermined point in the first mode may be the second point.

When the predetermined point has not passed in the first mode (NO in 1013), the short-range communication module 120 may receive the signal from the digital key in the first mode, and the controller 110 may control the lamp 140 or the short-range communication module 120 based on the RSSI of the signal received in the first mode.

That is, the controller 110 may control the lamp 140 to provide information related to digital key access to the user for a preset time, or control the short-range communication module 120 to transmit the digital key access signal to the digital key.

When the predetermined point has passed in the first mode (YES in 1013), the controller 110 may determine the reference range based on the RSSI of the signal received during the preset time in the first mode (1014). In the instant case, the controller 110 may store the reference range in the memory 130.

Figure 7:
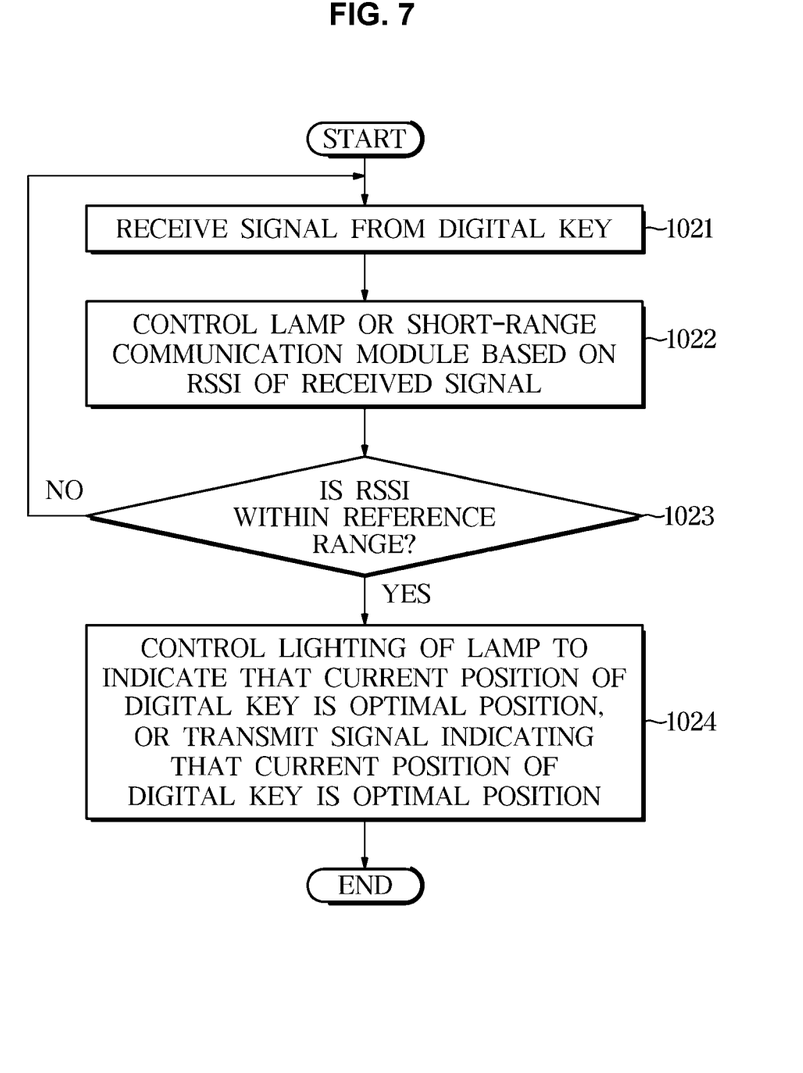
FIG. 7 is a flowchart illustrating a procedure in a second mode according to various exemplary embodiments of the present invention.

FIG. 7 is a flowchart illustrating a procedure in a second mode according to various exemplary embodiments of the present invention.

Referring to FIG. 7, in the second mode, the short-range communication module 120 may receive the signal from the digital key (1021). At the instant time, when the user approaches the digital key within the preset distance from the short-range communication module 120 and the short-range communication module 120 can receive the signal from the digital key, the controller 110 may control the lamp 140 to start the blinking.

The controller 110 may control the lamp 140 or the short-range communication module 120 based on the RSSI of the signal received in the second mode (1022). At the instant time, the user may know whether he or she approaches the digital key to the short-range communication module 120 by looking at the change in the blinking period of the lamp 140 or the information displayed on the display of the digital key.

The controller 110 may determine whether the RSSI of the signal received in the second mode is within the reference range (1023).

When the RSSI of the signal received in the second mode is within the reference range (NO in 1023), the short-range communication module 120 may receive the signal from the digital key in the second mode, and the controller 110 may control the lamp 140 or the short-range communication module 120 based on the RSSI of the signal received in the second mode.

That is, the controller 110 may control the lamp 140 to provide the user with information related to digital key access until the user places the digital key in the optimal position and the RSSI falls within the reference range, or control the short-range communication module 120 to transmit the digital key access signal to the digital key.

When the RSSI of the signal received in the second mode is within the reference range (YES in 1023), the controller 110 may control the lighting of the lamp 140 to indicate that the current position of the digital key is the optimal position, or control the short-range communication module 120 to transmit the signal indicating that the current position of the digital key is the optimal position through the digital key (1024).

According to the exemplary embodiments of the present invention, it is possible to provide the vehicle configured for informing the user of an optimal tag position of the digital key according to a signal received from a digital key and the method of controlling the vehicle.

According to the exemplary embodiments of the present invention, it is possible to provide a vehicle configured for informing the user of whether or not the digital key approaches the optimal tag position according to a signal received from the digital key and the method of controlling the vehicle.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A vehicle comprising:
a short-range communication module configured to receive a signal from a digital key within a preset distance ranging from the short-range communication module to the digital key;
a lamp; and
a controller connected to and configured to control the lamp and the short-range communication module according to a received signal strength indicator (RSSI) of the received signal,
wherein the controller is configured to:
determine a reference range based on the RSSI of the received signal in a first mode,
control the lamp to provide information related to a position of the digital key according to the RSSI of the received signal and the reference range in a second mode, and
control the short-range communication module to transmit a signal regarding the position of the digital key to the controller in the second mode.

2. The vehicle according to claim 1, wherein, in a response to a change in the RSSI of the received signal, the controller is configured to control the lamp to provide information related to access of the digital key based on the RSSI of the received signal.

3. The vehicle according to claim 1, wherein the controller is configured to determine a maximum value of the RSSI of the received signal in the first mode, and to determine the reference range based on the maximum value.

4. The vehicle according to claim 1, wherein, in a response to the RSSI of the received signal being within the reference range in the second mode, the controller is configured to control the lamp to inform that a current position of the digital key is an optimal position.

5. The vehicle according to claim 1, wherein the controller is configured to control the lamp to start blinking in a response to the digital key approaching within the preset distance.

6. The vehicle according to claim 1, wherein, in a response to the RSSI of the received signal being within the reference range in the second mode, the controller is configured to control an audio video navigation (AVN) device of the vehicle to indicate that a current position of the digital key is an optimal position.

7. The vehicle according to claim 1, wherein the short-range communication module includes a Near Field Communication (NFC) communication module or a Bluetooth communication module, and is provided on a door handle of the vehicle.

8. The vehicle according to claim 1, wherein the digital key communicating with the short-range communication module is a mobile device or an NFC card key.

9. A method of controlling a vehicle, the method comprising:
receiving, by a short-range communication module, a signal from a digital key within a preset distance ranging from the short-range communication module to the digital key;
controlling, by a controller, a lamp and the short-range communication module according to a received signal strength indicator (RSSI) of the received signal;
determining, by the controller, a reference range according to the RSSI of the received signal in a first mode;
controlling, by the controller, the lamp to provide information related to a position of the digital key according to the RSSI of the received signal and the reference range in a second mode; and
controlling, by the controller, the short-range communication module to transmit a signal regarding the position of the digital key to the controller in the second mode.

10. The method according to claim 9, wherein the controlling of the lamp according to the RSSI includes:
in a response to a change in the RSSI of the received signal, controlling, by the controller, the lamp to provide information related to access of the digital key according to the RSSI of the received signal.

11. The method according to claim 9, wherein the determining of the reference range includes:
determining, by the controller, a maximum value of the RSSI of the received signal in the first mode; and
determining, by the controller, the reference range based on the maximum value.

12. The method according to claim 9, wherein the controlling of the lamp to provide information related to the position of the digital key includes:
in a response to the RSSI of the received signal being within the reference range in the second mode, controlling, by the controller, the lamp to inform that a current position of the digital key is an optimal position.

13. The method according to claim 9, further including:
controlling, by the controller, the lamp to start blinking in a response to the digital key approaching within the preset distance.

14. The method according to claim 9, further including:
in a response to the RSSI of the received signal being within the reference range in the second mode, controlling, by the controller, an audio video navigation (AVN) device of the vehicle to indicate that a current position of the digital key is an optimal position.

15. The method according to claim 9, wherein the short-range communication module includes a Near Field Communication (NFC) communication module or a Bluetooth communication module, and is provided on a door handle of the vehicle.

16. The method according to claim 9, wherein the digital key is a mobile device or an NFC card key.

17. The method of claim 9, wherein the controller includes:
a processor; and
a non-transitory storage medium on which a program for performing the method of claim 9 is recorded and executed by the processor.

18. A non-transitory computer readable storage medium on which a program for performing the method of claim 9 is recorded.

* * * * *